(12) United States Patent
Kim et al.

(10) Patent No.: US 11,333,809 B2
(45) Date of Patent: May 17, 2022

(54) COMPOSITION FOR NEAR-INFRARED LIGHT-ABSORBING FILMS, NEAR-INFRARED LIGHT-ABSORBING LAYERS, CAMERA MODULES, AND ELECTRONIC DEVICES

(71) Applicant: Samsung Electronics Co., Ltd., Suwon-si (KR)

(72) Inventors: Changki Kim, Suwon-si (KR); Jong Hoon Won, Yongin-si (KR); Hyung Jun Kim, Suwon-si (KR); Yong Joo Lee, Suwon-si (KR); Myungsup Jung, Seongnam-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 610 days.

(21) Appl. No.: 16/023,037

(22) Filed: Jun. 29, 2018

(65) Prior Publication Data
US 2019/0079228 A1    Mar. 14, 2019

(30) Foreign Application Priority Data
Sep. 12, 2017   (KR) .................. 10-2017-0116532

(51) Int. Cl.
*G02B 5/20*    (2006.01)
*C09D 7/63*    (2018.01)
(Continued)

(52) U.S. Cl.
CPC .......... *G02B 5/208* (2013.01); *C09B 23/0075* (2013.01); *C09B 23/083* (2013.01);
(Continued)

(58) Field of Classification Search
CPC . G02B 5/208; C09D 7/63; C09D 7/41; C09D 5/32; C09D 133/00; C09D 133/08;
(Continued)

(56) References Cited

U.S. PATENT DOCUMENTS

| 7,521,006 B2 | 4/2009 | Ikeda et al. |
| 2005/0148786 A1 | 7/2005 | Ikeda et al. |

(Continued)

FOREIGN PATENT DOCUMENTS

| JP | 2006188653 A | 7/2006 |
| JP | 2006284630 A | 10/2006 |

(Continued)

OTHER PUBLICATIONS

Kazumasa Funabiki et al., "Improvement of the thermal stability of near-infrared-absorbing heptamethinecyanine dyes by anion-exchange from an iodide to fluorine-containing anions", Journal of Fluroine Chemistry, 174, pp. 132-136 (2015).

(Continued)

*Primary Examiner* — Ling Siu Choi
*Assistant Examiner* — Ronald Grinsted
(74) *Attorney, Agent, or Firm* — Harness, Dickey & Pierce, P.L.C.

(57) ABSTRACT

A composition for a near-infrared light-absorbing film includes a binder and compounds represented by separate particular chemical formulae. A near-infrared light-absorbing film may include a near-infrared light-absorbing layer including a cured product of the composition. A camera device may include the near-infrared light-absorbing film, and an electronic device may include the camera device.

18 Claims, 12 Drawing Sheets

(51) Int. Cl.
*C09D 7/41* (2018.01)
*C09B 23/00* (2006.01)
*C09B 23/08* (2006.01)
*C09B 57/00* (2006.01)
*C09B 67/00* (2006.01)
*C09D 5/32* (2006.01)
*C09D 133/00* (2006.01)
*C09D 133/08* (2006.01)
*C09B 23/01* (2006.01)
*C09B 67/02* (2006.01)
*C09B 67/22* (2006.01)
*C08K 5/29* (2006.01)
*C08K 5/3417* (2006.01)

(52) U.S. Cl.
CPC .......... *C09B 57/007* (2013.01); *C09B 57/008* (2013.01); *C09B 67/0033* (2013.01); *C09B 67/0097* (2013.01); *C09D 5/32* (2013.01); *C09D 7/41* (2018.01); *C09D 7/63* (2018.01); *C09D 133/00* (2013.01); *C09D 133/08* (2013.01); *C08K 5/29* (2013.01); *C08K 5/3417* (2013.01); *C08K 2201/014* (2013.01)

(58) Field of Classification Search
CPC . C09B 23/0075; C09B 23/083; C09B 57/007; C09B 57/008; C09B 67/0033; C09B 67/0097; C08K 5/29; C08K 5/3417; C08K 2201/014
USPC ........................................................ 252/587
See application file for complete search history.

(56) References Cited

U.S. PATENT DOCUMENTS

| | | |
|---|---|---|
| 2008/0048155 A1 | 2/2008 | Toriniwa et al. |
| 2016/0195651 A1 | 7/2016 | Yoshioka et al. |
| 2017/0017023 A1 | 1/2017 | Sugiyama et al. |

FOREIGN PATENT DOCUMENTS

| | | | |
|---|---|---|---|
| JP | 2008-176143 A | | 7/2008 |
| JP | 2008303308 A | | 12/2008 |
| JP | 2010098073 A | | 4/2010 |
| JP | 5015911 B2 | | 9/2012 |
| JP | 2013218312 | * | 10/2013 |
| JP | 6056561 B2 | | 1/2017 |
| KR | 2006-0111471 A | | 10/2006 |
| KR | 2007-0041718 A | | 4/2007 |
| KR | 10-1219108 B1 | | 1/2013 |
| KR | 10-2015-0023375 A | | 3/2015 |
| KR | 10-1611807 B1 | | 4/2016 |
| KR | 2016-0130987 A | | 11/2016 |
| WO | WO-2014/192714 A1 | | 12/2014 |

OTHER PUBLICATIONS

Korean Office Action dated Jan. 7, 2022 for corresponding Korean Application No. 10-2017-0116532, and English-language translation thereof.

* cited by examiner

COMPOSITION FOR NEAR-INFRARED LIGHT-ABSORBING FILMS, NEAR-INFRARED LIGHT-ABSORBING LAYERS, CAMERA MODULES, AND ELECTRONIC DEVICES

CROSS-REFERENCE TO RELATED APPLICATIONS

This application claims priority to and the benefit of, under 35 U.S.C. § 119, Korean Patent Application No. 10-2017-0116532 filed in the Korean Intellectual Property Office on Sep. 12, 2017, the entire contents of which are incorporated herein by reference.

BACKGROUND

1. Field

A composition for near-infrared light-absorbing films, near-infrared light-absorbing layers, camera module, and electronic devices are disclosed.

2. Description of the Related Art

Recently, electronic devices including image sensors that store an image as an electrical signal, such as cell phones, digital cameras, camcorders, and cameras, have been widely used.

An electronic device may include an optical filter including a near-infrared light-absorbing film, so that the electronic device is configured to reduce or prevent generation of an optical distortion by light in the other wavelength spectra of light than a visible wavelength spectrum of light.

The near-infrared light-absorbing film is mounted on a front surface of an image sensor of a camera module and absorbs at least one beam of light in a near-infrared wavelength spectrum of light from outside (e.g., an ambient environment) effectively and solves an optical distortion phenomenon.

The near-infrared light-absorbing film may be manufactured based on coating a composition and drying the same, and a conventional composition includes a copper sulfonate salt. However, the copper sulfonate salt has very low UV absorption capability (intensity), and thus has to be used in an excessive amount. Therefore, viscosity increase during preparation of high concentration copper salt solution may be caused; such a viscosity increase is not desirable for manufacture of a thin film.

In addition, it has been suggested that an organic dye may be used instead of a copper sulfonate salt, but the organic dye may have a relatively narrow UV absorption wavelength spectrum range and thus may result in the near-infrared light-absorbing film having degraded performance.

SUMMARY

Some example embodiments include a composition for a near-infrared light-absorbing film that has a thin thickness and configured to reduce or prevent optical distortion effectively.

Some example embodiments include a near-infrared light-absorbing film including a near-infrared light-absorbing layer manufactured using the composition.

Some example embodiments include a camera module ("camera device") including the near-infrared light-absorbing film.

Some example embodiments include an electronic device including the camera module.

According to some example embodiments, a composition may include a binder, a compound represented by Chemical Formula 1, and a compound represented by Chemical Formula 2.

[Chemical Formula 1]

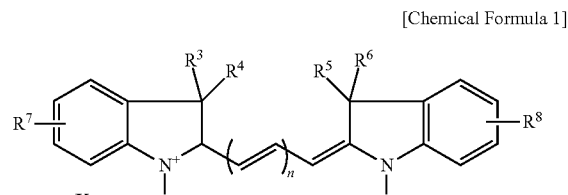

[Chemical Formula 2]

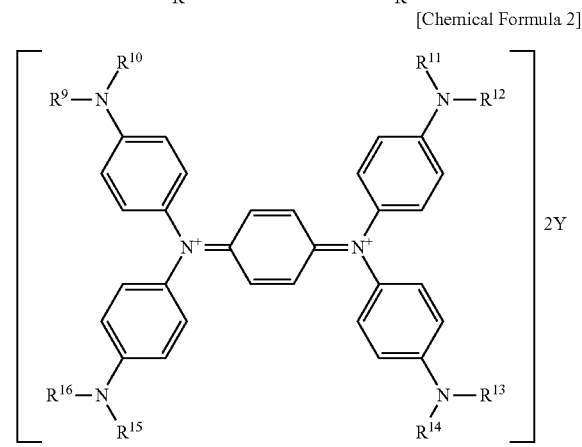

In Chemical Formula 1 and Chemical Formula 2, $R^1$ to $R^8$ are independently a hydrogen atom or a substituted or unsubstituted C1 to C8 alkyl group, $R^9$ to $R^{16}$ are independently a hydrogen atom, a substituted or unsubstituted C1 to C20 alkyl group, or a substituted or unsubstituted C6 to C20 aryl group, X is $PF_6^-$ or $BF_4^-$, Y is $PF_6^-$, and n is an integer ranging from 1 to 10.

The compound represented by Chemical Formula 1 may have a maximum absorption wavelength ($\lambda_{max}$) within a wavelength spectrum of about 700 nm to about 800 nm and the compound represented by Chemical Formula 2 may have a maximum absorption wavelength ($\lambda_{max}$) within a wavelength spectrum of about 800 nm to about 1200 nm.

The composition may include a first amount of the compound represented by Chemical Formula 1 and a second amount of the compound represented by Chemical Formula 2, the first amount equal to or less than the second amount.

The compound represented by Chemical Formula 1 and the compound represented by Chemical Formula 2 may be included in the composition in a weight ratio of about 1:1 to about 1:3.

A total amount of the first amount and the second amount may be an amount of about 0.2 parts by weight to about 5.0 parts by weight relative to 100 parts by weight of the binder.

The composition may further include a squarylium-based compound represented by Chemical Formula 3.

[Chemical Formula 3]

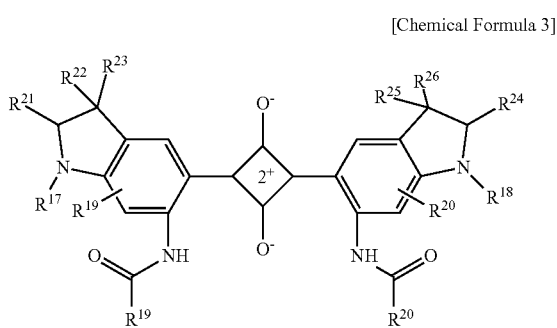

In Chemical Formula 3, $R^{17}$ to $R^{26}$ are independently a hydrogen atom, a substituted or unsubstituted C1 to C20 alkyl group, or a substituted or unsubstituted C6 to C20 aryl group.

The compound represented by Chemical Formula 1 may have an absorbance at a maximum absorption wavelength ($\lambda_{max}$) that is at least about 30 times as great as an absorbance of the compound represented by Chemical Formula 1 at a wavelength of about 550 nm, and the compound represented by Chemical Formula 2 may have an absorbance at a maximum absorption wavelength ($\lambda_{max}$) that is at least about 20 times as great as an absorbance of the compound represented by Chemical Formula 2 at a wavelength of about 550 nm.

The composition may have an average light transmittance of less than or equal to about 10% in a wavelength spectrum of light of about 700 nm to about 740 nm.

The composition may have an average light transmittance of greater than or equal to about 82% in a wavelength spectrum of light of about 430 nm to about 565 nm.

The binder may include an acrylic binder, an epoxy binder, or a combination thereof.

The binder may include a thermally curable binder, a photo-curable binder or a combination thereof.

According to some example embodiments, a near-infrared light-absorbing film includes a near-infrared light-absorbing layer including a cured product of the composition.

The near-infrared light-absorbing layer may be manufactured by coating a solution including the composition and a solvent on the polymer film and drying the same.

The near-infrared light-absorbing film may further include a polymer film disposed on one surface of the near-infrared light-absorbing layer.

The polymer film may include polyethylene terephthalate, polyethylene naphthalate, triacetyl cellulose, polycarbonate, a cycloolefin polymer, poly(meth)acrylate, polyimide, or a combination thereof.

The polymer film may be configured to selectively absorb light in a wavelength spectrum of light that is at least a portion of an ultraviolet (UV) wavelength spectrum of light.

The near-infrared light-absorbing film may further include an additional near-infrared light-absorbing layer on at least one surface of one surface of the polymer film, and one surface of the near-infrared light-absorbing layer.

The additional near-infrared light-absorbing layer may include a copper phosphate salt.

The near-infrared light-absorbing film may have a thickness of about 25 μm to about 110 μm.

According to some example embodiments, a camera device includes the near-infrared light-absorbing film.

The camera device may further include a lens and an image sensor.

According to some example embodiments, an electronic device includes the camera device.

The near-infrared light-absorbing film having a thin thickness and capable of preventing light in a near infrared region effectively thus reduces or prevents optical distortion effectively.

DETAILED DESCRIPTION

Figure 1:
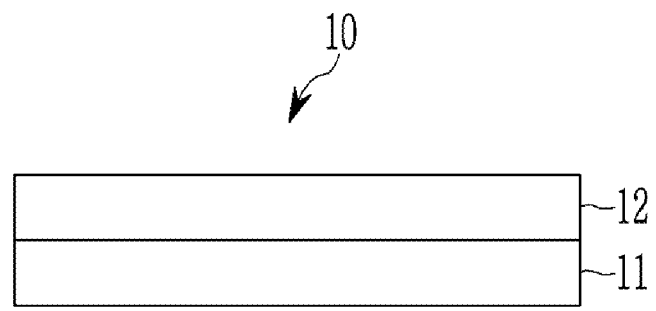
FIG. 1 is a schematic cross-sectional view showing a near-infrared light-absorbing film according to some example embodiments.

As used herein, when specific definition is not otherwise provided, "alkyl group" refers to a C1 to C20 alkyl group and "aryl group" refers to a C6 to C20 aryl group.

As used herein, when specific definition is not otherwise provided, "substituted" refers to replacement of at least one hydrogen by a halogen atom (F, Cl, Br, or I), a hydroxy group, a C1 to C20 alkoxy group, a nitro group, a cyano group, an amine group, an imino group, an azido group, an amidino group, a hydrazino group, a hydrazono group, a carbonyl group, a carbamyl group, a thiol group, an ester group, an ether group, a carboxyl group or a salt thereof, a sulfonic acid group or a salt thereof, a phosphoric acid or a salt thereof, a C1 to C20 alkyl group, a C2 to C20 alkenyl group, a C2 to C20 alkynyl group, a C6 to C20 aryl group, a C3 to C20 cycloalkyl group, a C3 to C20 cycloalkenyl group, a C3 to C20 cycloalkynyl group, a C2 to C20 heterocycloalkyl group, a C2 to C20 heterocycloalkenyl group, a C2 to C20 heterocycloalkynyl group, a C3 to C20 heteroaryl group, or a combination thereof.

As used herein, when a definition is not otherwise provided, in chemical formulae, hydrogen is bonded at the position when a chemical bond is not drawn where supposed to be given.

As used herein, an average light transmittance refers to an average value of light transmittances measured when incident light is radiated in a vertical direction (a front side direction) of an optical filter.

Hereinafter, example embodiments of the inventive concepts will be described in detail so that a person skilled in the art would understand the same. This disclosure may, however, be embodied in many different forms and is not construed as limited to the example embodiments set forth herein.

In the drawings, the thickness of layers, films, panels, regions, etc., are exaggerated for clarity. Like reference numerals designate like elements throughout the specification. It will be understood that when an element such as a layer, film, region, or substrate is referred to as being "on" another element, it can be directly on the other element or intervening elements may also be present. In contrast, when an element is referred to as being "directly on" another element, there are no intervening elements present.

Hereinafter, a composition according to some example embodiments is described.

A composition according to some example embodiments includes a binder, a compound represented by Chemical Formula 1, and a compound represented by Chemical Formula 2.

[Chemical Formula 1]

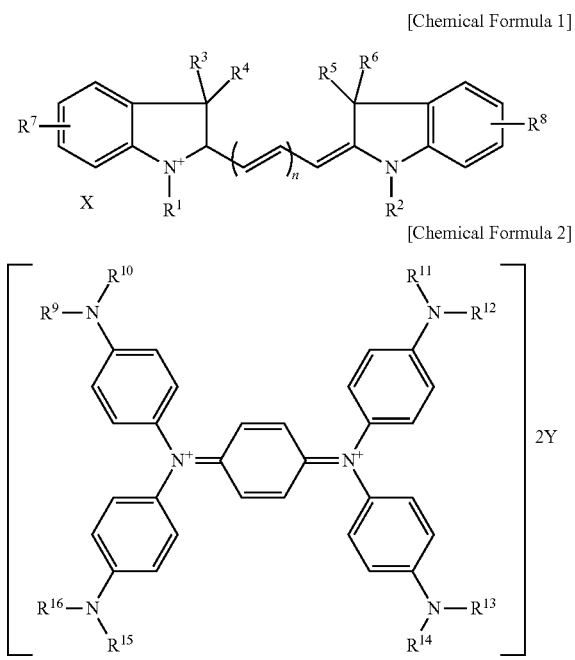

[Chemical Formula 2]

In Chemical Formula 1 and Chemical Formula 2, $R^1$ to $R^8$ are independently a hydrogen atom or a substituted or unsubstituted C1 to C8 alkyl group, $R^9$ to $R^{16}$ are independently a hydrogen atom, a substituted or unsubstituted C1 to C20 alkyl group, or a substituted or unsubstituted C6 to C20 aryl group, X is $PF_6^-$ or $BF_4^-$, Y is $PF_6^-$, and n is an integer ranging from 1 to 10.

For example, the $R^1$ to $R^{16}$ may independently be a substituted or unsubstituted C1 to C10 alkyl group.

For example, the $R^1$, $R^2$, and $R^9$ to $R^{16}$ may independently be a substituted or unsubstituted C4 to C10 alkyl group.

An organic dye has a relatively narrow UV absorption wavelength spectrum range, and thus a single organic dye has a limit for absorbing light in a near infrared region (a single organic dye that expresses color and has a small UV absorption wavelength spectrum range is used as a medical labeling material for anti-cancer diagnosis and the like or a coloring material for clothes).

A composition according to some example embodiments includes two kinds ("types") of organic dyes, specifically the compound represented by Chemical Formula 1 (dye) and the compound represented by Chemical Formula 2 (dye) along with a binder, and thereby problems of a conventional organic dye having ("associated with," "including," etc.) a narrow UV absorption wavelength spectrum range may be solved.

Specifically, a cyanine-based or diimmonium-based compound including an iodine anion (I⁻) has been conventionally used as a dye, but salts including an iodine anion have low solubility in an organic solvent and thus limitedly used with the organic solvent. However, according to some example embodiments, $PF_6^-$ or $BF_4^-$ may be used instead of the conventional iodine anion to much improve solubility in the organic solvent and simultaneously, decrease light transmittance in a region ("wavelength spectrum") of about 700 nm to about 740 nm down to less than or equal to about 10% but maintain greater than or equal to about 82% of light transmittance in a region of about 430 nm to about 565 nm and thus may be usefully used to from a near-infrared light-absorbing film for an optical filter.

In addition, when $R^1$, $R^2$, and $R^9$ to $R^{16}$ are independently substituted or unsubstituted C4 to C10 alkyl groups in Chemical Formulae 1 and 2, the solubility in the organic solvent may be further improved.

The compound represented by Chemical Formula 1 may have a maximum absorption wavelength ($\lambda_{max}$) in about 700 nm to about 800 nm and the compound represented by Chemical Formula 2 may have a maximum absorption wavelength ($\lambda_{max}$) in about 800 nm to about 1200 nm. According to some example embodiments, compounds represented by Chemical Formulae 1 and 2 may be used in a smaller amount than that of either one dye alone but not decrease transmittance in a visible region ("visible wavelength spectrum of light") but simultaneously vastly blocks light in a near infrared region ("near-infrared wavelength spectrum of light") and thus be appropriately used as a composition for a near-infrared light-absorbing film.

Particularly, the compound represented by Chemical Formula 1 may be included in an equal or smaller amount than the compound represented by Chemical Formula 2. Restated, the composition as described herein may include a first amount of the compound represented by Chemical Formula 1 and a second amount of the compound represented by Chemical Formula 2, where the first amount is equal to or less than the second amount. For example, the compound represented by Chemical Formula 2 partly absorbs light in a region of about 430 nm to about 565 nm and decreases light transmittance in a visible region. Accordingly, as the compound represented by Chemical Formula 1 is included in an equal or smaller amount than that of the compound represented by Chemical Formula 2, light transmittance in a near infrared region, for example, a region ranging from about 700 nm to about 770 nm, for example, from about 700 nm to about 740 nm may be decreased down to less than or equal to about 10%, for example, less than or equal to about 6% and thus usefully used to form a near-infrared light-absorbing film having high transmittance for an optical filter. As the compound represented by Chemical Formula 1 is included in a larger amount, visible light transmittance may be increased, but as the compound represented by Chemical Formula 2 is included in a larger amount, the compound tends to more absorb light in a visible region and decrease transmittance.

Particularly, the compound represented by Chemical Formula 1 and the compound represented by Chemical Formula 2 may be included in the composition as described herein in a weight ratio of about 1:1 to about 1:3. For example, a total amount of the compound represented by Chemical Formula 1 and the compound represented by Chemical Formula 2 may be included in an amount of about 0.2 parts by weight to about 5.0 parts by weight, for example about 0.2 parts by weight to about 1.0 part by weight, for example about 0.2 parts by weight to about 0.5 parts by weight relative to 100 parts by weight of the binder. Restated, a total amount of the first amount and the second amount may be an amount of about 0.2 parts by weight to about 5.0 parts by weight relative to 100 parts by weight of the binder. Herein, the compound represented by Chemical Formula 1 and the compound represented by Chemical Formula 2 may decrease light transmittance in a near infrared region, for example, in a region of about 700 nm to about 770 nm, for example, in a region ("wavelength spectrum of light") of about 700 nm to about 740 nm down to less than or equal to about 10%, for example, less than or equal to about 6% and absorb light in a near infrared region of greater than or equal to about 800 nm and thus may be usefully used to form a near-infrared light-absorbing film having high transmittance.

Figure 6:
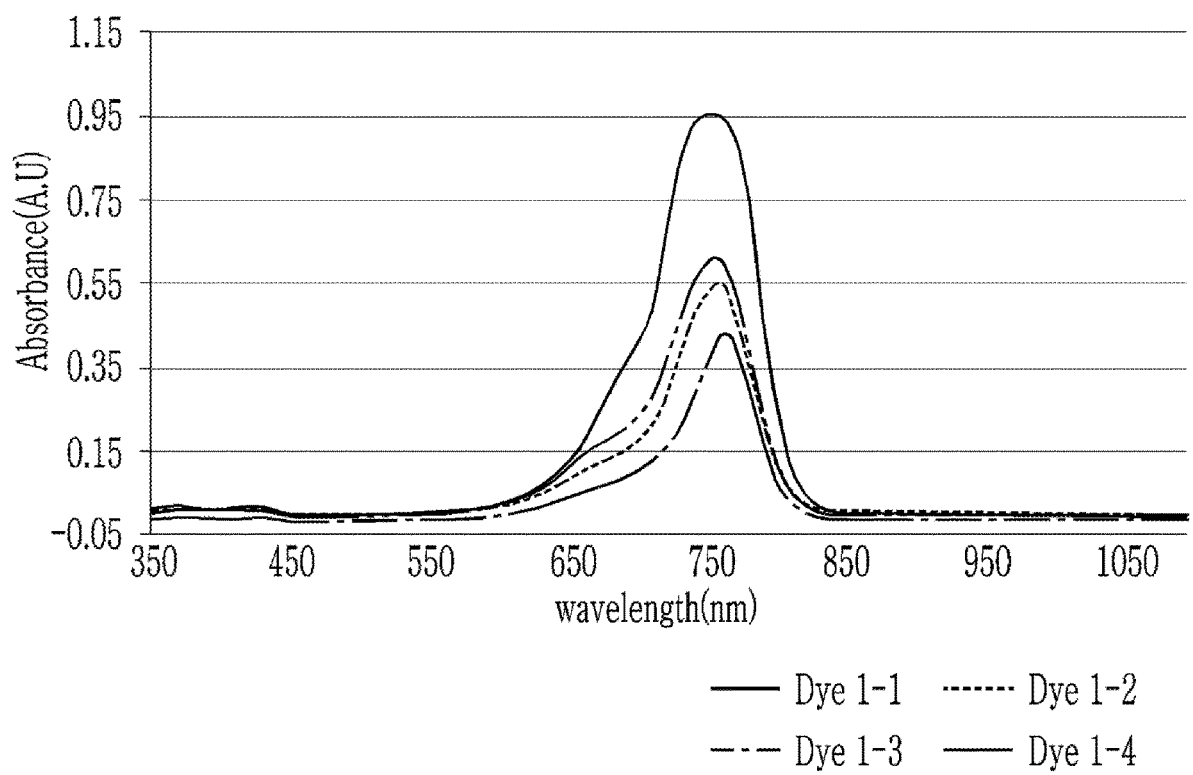
Figure 7:
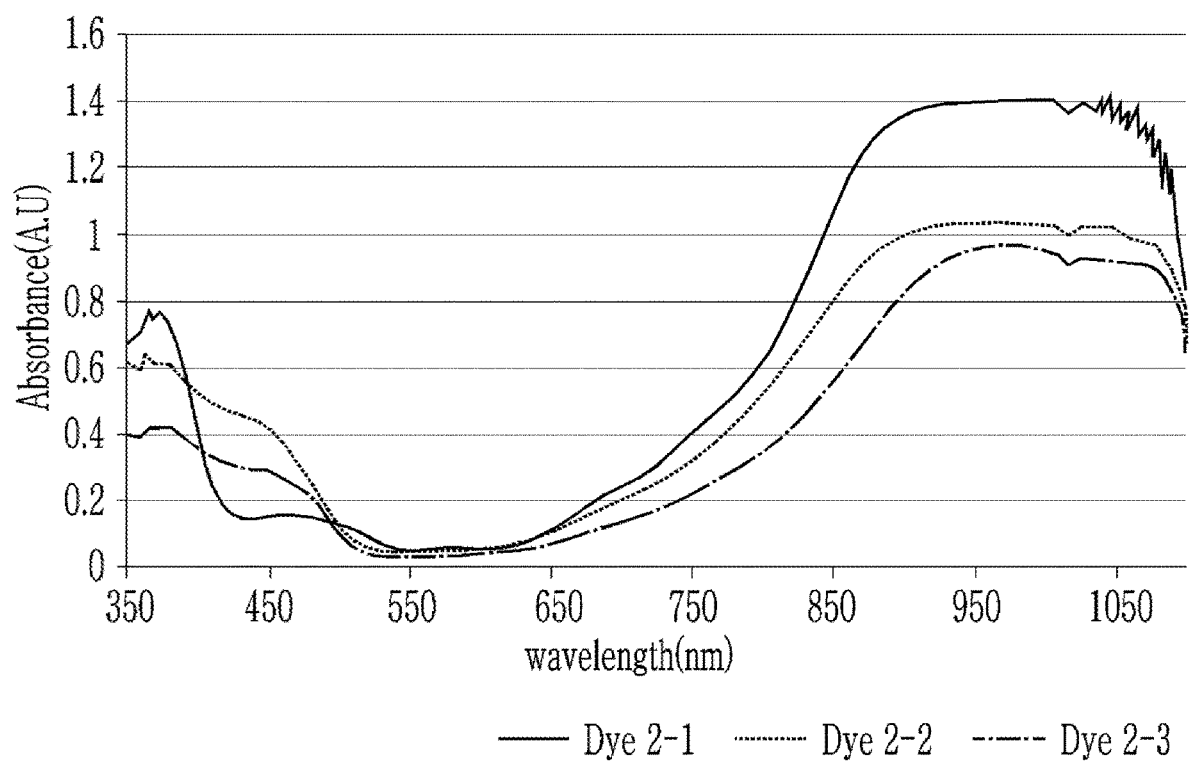
Figure 8:
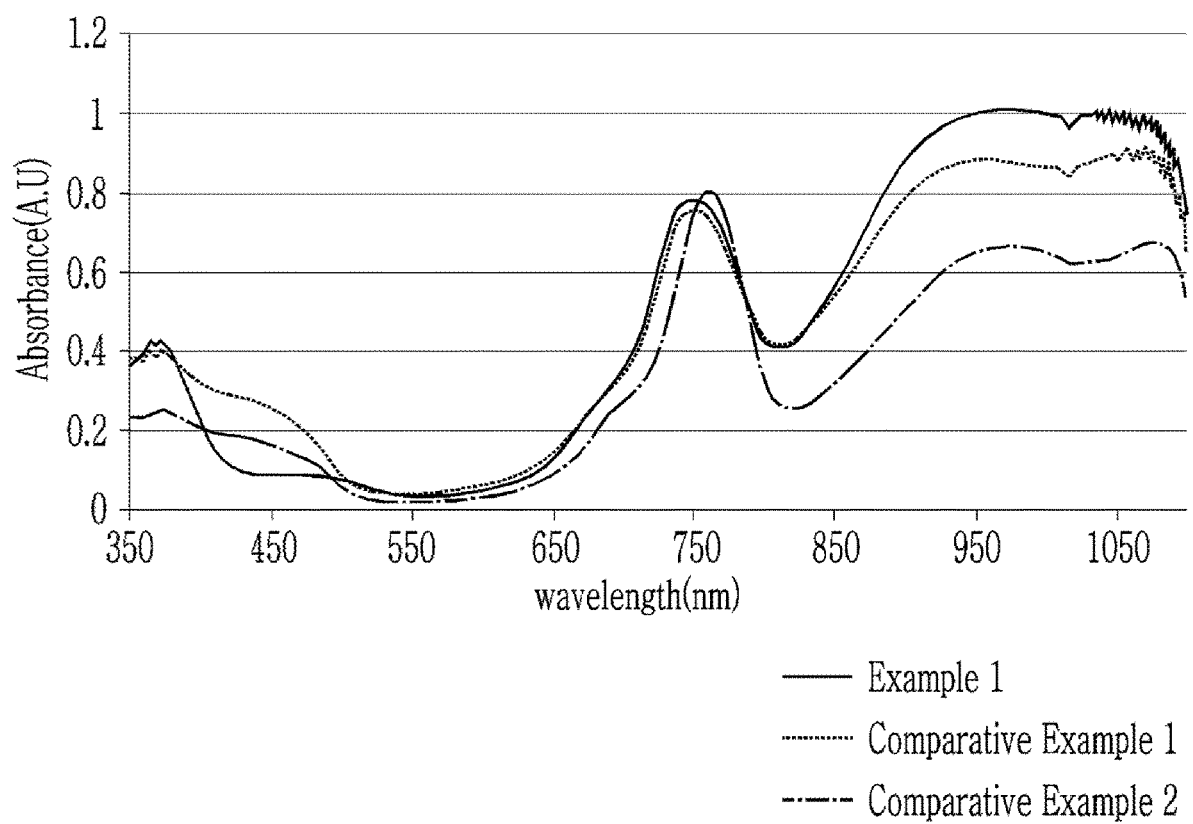
FIG. 8, FIG. 9, FIG. 10, and FIG. 11 are respectively graphs showing absorbance depending on a wavelength of the compositions according to examples and comparative examples according to some example embodiments.
Figure 9:
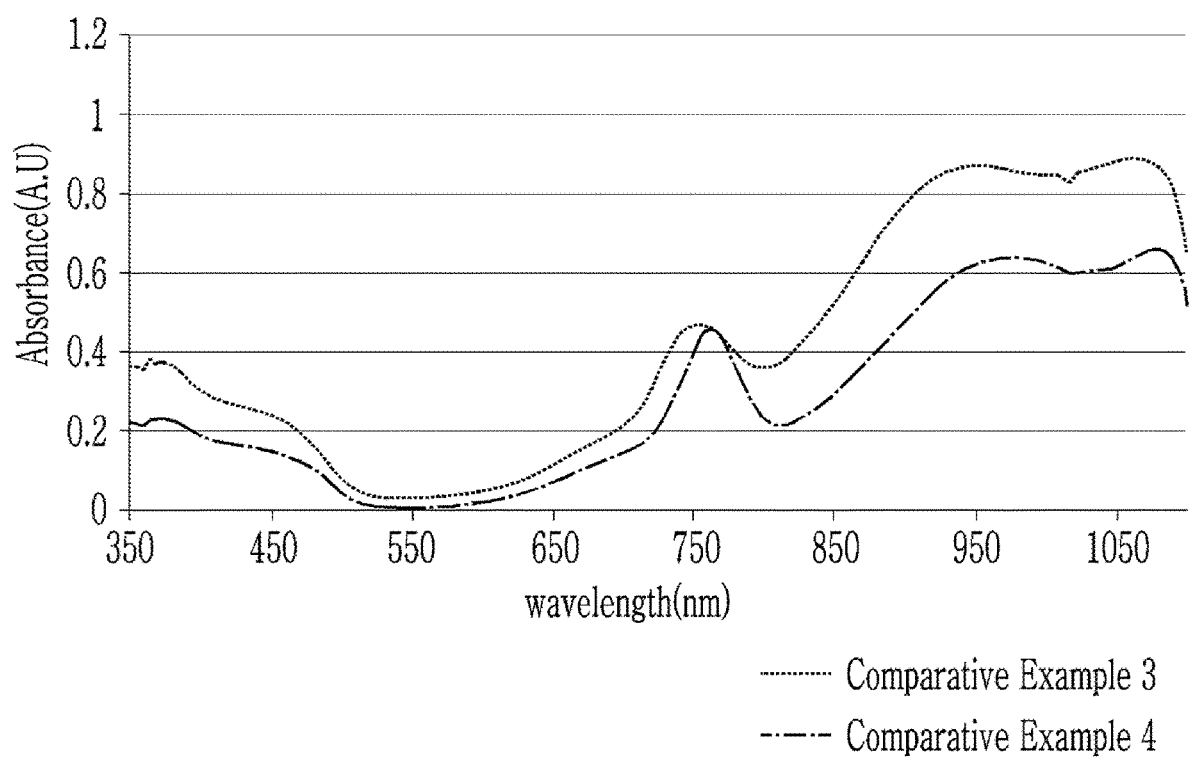
Figure 10:
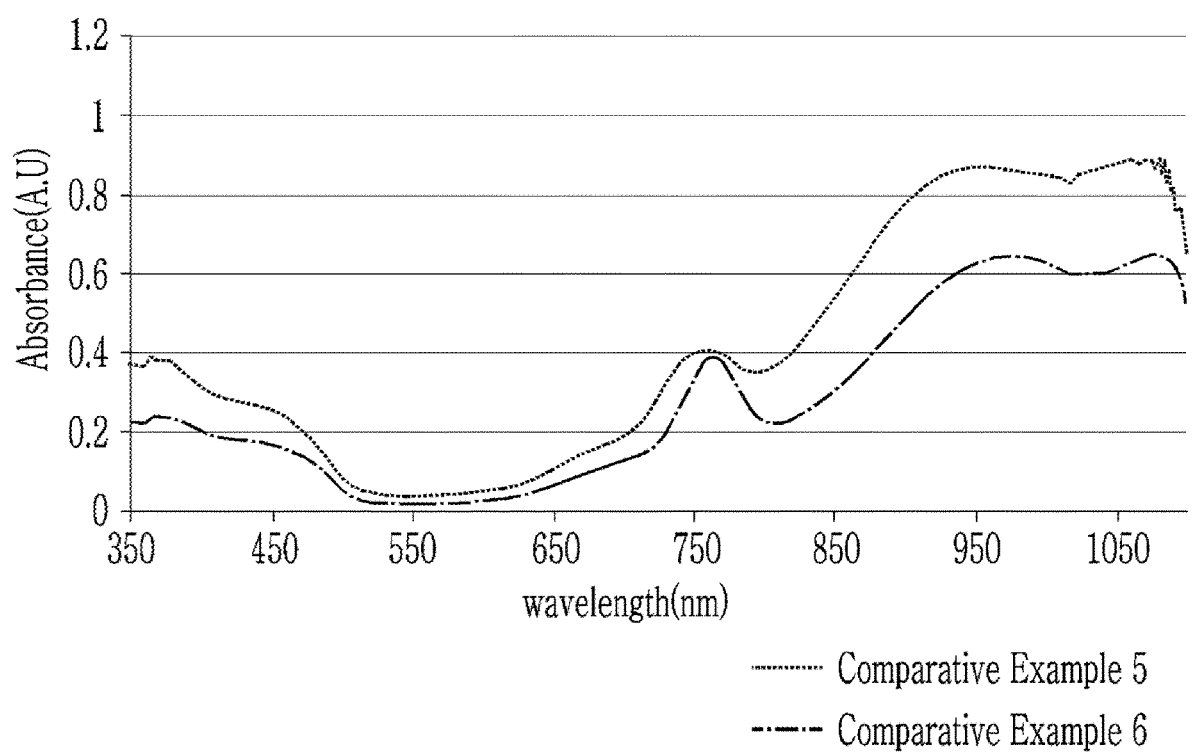
Figure 11:
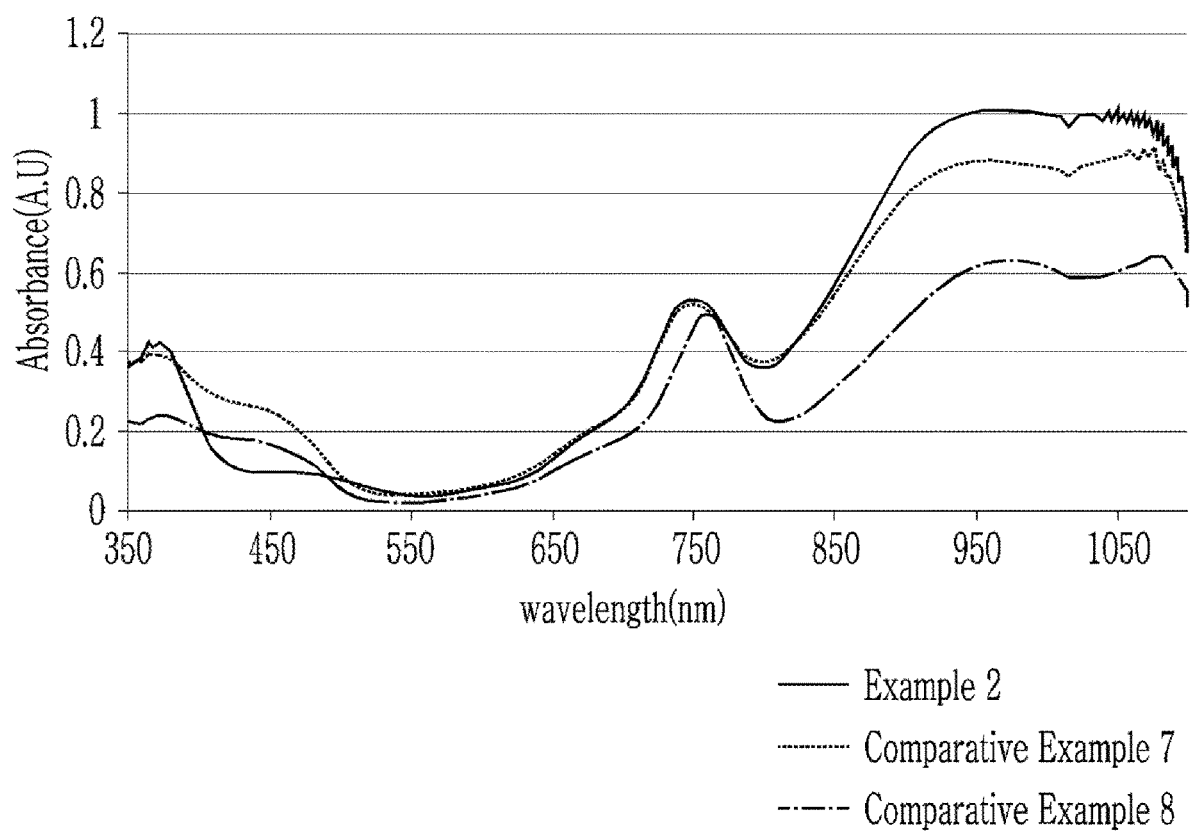

On the other hand, as shown in FIGS. 6 and 7, since the compound represented by Chemical Formula 1 has an absorbance at a maximum absorption wavelength ($\lambda_{max}$) that is at least about 30 times as high ("30 times as great") as an absorbance of the compound represented by Chemical Formula 1 at a wavelength of about 550 nm, and the compound represented by Chemical Formula 2 has an absorbance at a maximum absorption wavelength ($\lambda_{max}$) that is at least about 20 times as high ("20 times as great") as an absorbance of the compound represented by Chemical Formula 2 at a wavelength of about 550 nm, light transmittance in a near infrared region may be decreased down to less than or equal to about 10% without decreasing transmittance in a visible region.

When the absorbance at a maximum absorption wavelength ($\lambda_{max}$) of the cyanine-based compound is less than about 30 times as high as the absorbance at a wavelength of about 550 nm, and the absorbance at a maximum absorption wavelength ($\lambda_{max}$) of the diimmonium-based compound is less than about 20 times as high as the absorbance at a wavelength of about 550 nm, light transmittance in a wavelength spectrum of light ranging from about 700 nm to about 740 nm is a little increased, and thus the compounds may not be used to prepare the composition for a near-infrared light-absorbing film.

The composition may further include a compound having a different structure from Chemical Formula 1 and Chemical Formula 2. In this case, light transmittance in a wavelength spectrum of light of about 740 nm to about 950 nm may be improved.

The compound having a different structure from Chemical Formula 1 and Chemical Formula 2 may include, for example, a polymethine-based compound, a phthalocyanine-based compound, a merocyanine-based compound, a naphthalocyanine-based compound, an immonium-based compound, a triarylmethane-based compound, a dipyrromethene-based compound, an anthraquinone-based compound, a naphthoquinone-based compound, diquinone-based compound, a squarylium-based compound, a rylene-based compound, a perylene-based compound, a squaraine-based compound, a pyrylium-based compound, a thiopyrylium-based compound, a diketopyrrolopyrrole-based compound, a dithiolene metal complex-based compound, a derivative thereof, or a combination thereof, but is not limited thereto.

For example, the compound having a different structure from Chemical Formula 1 and Chemical Formula 2 may be a squarylium-based compound represented by Chemical Formula 3.

[Chemical Formula 3]

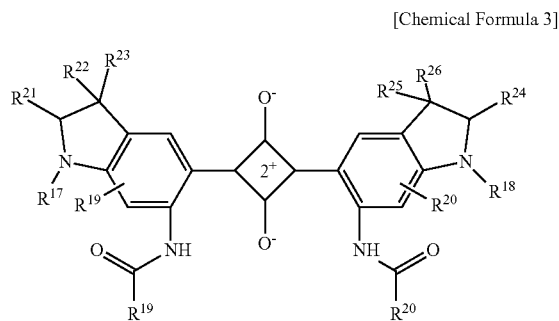

In Chemical Formula 3, $R^{17}$ to $R^{26}$ are independently a hydrogen atom, a substituted or unsubstituted C1 to C20 alkyl group, or a substituted or unsubstituted C6 to C20 aryl group.

The composition may have an average light transmittance of less than or equal to about 10% in a wavelength spectrum of light of about 700 nm to about 740 nm. Herein, the average light transmittance refers to an average value of light transmittance measured when incident light is radiated in a vertical direction (front side direction) of the optical filter that will be described later.

The composition may have an average light transmittance of greater than or equal to about 80%, for example greater than or equal to about 82% in a wavelength spectrum of light of about 430 nm to about 565 nm. Herein, the average light transmittance refers to an average value of light transmittance measured when incident light is radiated in a vertical direction (front side direction) of the optical filter that will be described later.

The binder may be, for example an organic binder, an inorganic binder, an organic/inorganic binder, or a combination thereof, and may be mixed with the compounds represented by Chemical Formula 1 and Chemical Formula 2 or may disperse the compounds represented by Chemical Formula 1 and Chemical Formula 2. The binder is not particularly limited as long as it attaches the compounds represented by Chemical Formula 1 and Chemical Formula 2 to the polymer film well.

The binder may be an acrylic binder an epoxy binder, or a combination thereof. For example, the binder may be an acrylic binder that may be a curable binder, for example a thermally curable binder, a photo-curable binder, or a combination thereof.

The binder may be for example methyl cellulose, ethyl cellulose, hydroxypropyl methyl cellulose (HPMC), hydroxypropyl cellulose (HPC), a xanthan gum, polyvinyl alcohol (PVA), polyvinyl pyrrolidone (PVP), carboxyl methyl cellulose, hydroxyethyl cellulose, or a combination thereof, but is not limited thereto.

Hereinafter, a near-infrared light-absorbing film according to some example embodiments that is a near-infrared light-absorbing film including a near-infrared light-absorbing layer manufactured using the composition is described with reference to the drawings.

FIG. 1 is a schematic cross-sectional view showing a near-infrared light-absorbing film according to some example embodiments.

Referring to FIG. 1, a near-infrared light-absorbing film 10 according to some example embodiments includes a polymer film 11 and a near-infrared light-absorbing layer 12.

The polymer film 11 may be a transparent polymer film and have for example an average light transmittance of greater than or equal to about 80% in a visible region. Within the range, it may have an average light transmittance of greater than or equal to about 85%. Herein, the visible region may be for example a wavelength spectrum of light of greater than about 380 nm and less than about 700 nm, for example about 430 nm to about 565 nm and the average light transmittance is an average value of light transmittance measured when incident light is radiated in a vertical direction (a front side direction) of the polymer film 11.

The polymer film 11 may include, for example polyethylene terephthalate, polyethylene naphthalate, triacetyl cellulose, polycarbonate, a cycloolefin polymer, poly(meth) acrylate, polyimide, or a combination thereof, but is not limited thereto.

The polymer film 11 may be configured to selectively absorb light in a wavelength spectrum of light that is at least a portion of an ultraviolet (UV) wavelength spectrum of light. Herein, the ultraviolet (UV) region may be, for example a wavelength spectrum of light of less than or equal to about 380 nm.

The polymer film 11 may absorb most of light in a wavelength spectrum of light of at least about 350 nm to about 380 nm, and thus an average light transmittance of the near-infrared light-absorbing film 10 in a wavelength spectrum of light of about 350 nm to 380 nm may be less than or equal to about 1%, for example less than or equal to about 0.8% or less than or equal to about 0.5%.

The polymer film 11 may include various additives according to required properties of the near-infrared light-absorbing film 10.

The polymer film 11 may have a thickness of about 25 μm to about 105 μm.

The near-infrared light-absorbing layer 12 transmits light in a visible region and selectively absorbs at least one part of light in a near infrared region. Herein the visible region may be for example a wavelength spectrum of light of greater than about 380 nm and less than about 700 nm, for example about 430 nm to about 565 nm and the near infrared region may be for example a wavelength spectrum of light of about 780 nm to about 1200 nm, for example about 700 nm to about 1200 nm.

The near-infrared light-absorbing layer 12 may be formed from a solution including the dye, the binder, and a solvent.

The solvent is not particularly limited, as long as it dissolves and/or disperses the dye and the binder, and may be for example one or more selected from water; an alcohol based solvent such as methanol, ethanol, n-propyl alcohol, isopropyl alcohol, n-butanol, isobutanol, t-butanol, propylene glycol, propylene glycolmethylether, ethylene glycol, and the like; an aliphatic hydrocarbon solvent such as hexane, heptane, and the like; an aromatic hydrocarbon solvent such as toluene, pyridine, quinoline, anisole, mesitylene, xylene, and the like; a ketone-based solvent such as methyl isobutyl ketone, 1-methyl-2-pyrrolidinone (NMP), cyclohexanone, acetone, and the like; an ether-based solvent such as tetrahydrofuran, isopropyl ether, and the like; an acetate-based solvent such as ethyl acetate, butyl acetate, propylene glycol methyl ether acetate, and the like; an amide-based solvent such as dimethylacetamide, dimethyl formamide (DMF), and the like; a nitrile-based solvent such as acetonitrile, benzonitrile, and the like; and a mixture of the solvents, but is not limited thereto.

The solution may be coated on the polymer film 11, dried, and optionally cured by heat and/or light. The coating may be for example a spin coating, a slit coating, a bar coating, a blade coating, a slot die coating, and/or an inkjet coating. The drying may be for example performed by natural drying, hot air drying, and/or a heat treatment at a higher temperature than the boiling point of the solvent.

The near-infrared light-absorbing layer 12 may have for example a thickness of about 1 μm to about 20 μm.

The near-infrared light-absorbing film 10 has a structure where the polymer film 11 and the near-infrared light-absorbing layer 12 are sequentially stacked as described above and thereby light in a visible region may be effectively transmitted and light in a near infrared region may be effectively blocked. In addition, light in an ultraviolet (UV) region may be effectively blocked by imparting an absorption function of light in an ultraviolet (UV) region to the polymer film 11. Accordingly, the near-infrared light-absorbing film 10 may effectively sense light in a visible region in a sensor sensing light such as an image sensor by increasing purity of transmittance of light in a visible region of light in all wavelength spectrum of lights and thus optical distortion by light besides visible region may be decreased or prevented.

The near-infrared light-absorbing film 10 may effectively transmit light in a visible region and selectively block light in a near infrared region by a combination of the polymer film 11 and the near-infrared light-absorbing layer 12.

For example, the near-infrared light-absorbing film 10 may have, for example an average light transmittance of greater than or equal to about 70% in a visible region of greater than about 380 nm and less than about 700 nm, and for example an average light transmittance of greater than or equal to about 80% or greater than or equal to about 82% in a wavelength spectrum of light of about 430 nm to about 565 nm. Herein, the average light transmittance refers to an average value of light transmittance measured when incident light is radiated in a vertical direction (front side direction) of the near-infrared light-absorbing film 10.

For example, the near-infrared light-absorbing film 10 may have, for example an average light transmittance of less than or equal to about 45% in a near infrared region of about 740 nm to about 950 nm, less than or equal to about 10% in a near infrared region of about 700 nm to about 800 nm, or less than or equal to about 3%, for example less than or equal to about 6% in a near infrared region of about 700 nm to about 740 nm.

For example, the near-infrared light-absorbing film 10 may have, for example a maximum absorption wavelength ($\lambda_{max}$) in a wavelength spectrum of light of about 700 nm to about 800 nm, a maximum absorption wavelength ($\lambda_{max}$) in a wavelength spectrum of light of about 700 nm to about 760 nm, or a maximum absorption wavelength ($\lambda_{max}$) in a wavelength spectrum of light of about 720 nm to about 750 nm.

For example, the near-infrared light-absorbing film 10 may have, for example a maximum absorption wavelength ($\lambda_{max}$) in a wavelength spectrum of light of about 600 nm to about 800 nm, a maximum absorption wavelength ($\lambda_{max}$) in a wavelength spectrum of light of about 700 nm to about 800 nm, a maximum absorption wavelength ($\lambda_{max}$) in a wavelength spectrum of light of about 700 nm to about 760 nm, or a maximum absorption wavelength ($\lambda_{max}$) in a wavelength spectrum of light of about 720 nm to about 750 nm.

For example, the near-infrared light-absorbing film 10 may have high absorbance and low light transmittance in a near infrared wavelength spectrum of light while it may have low absorbance and high light transmittance in a mid-infrared wavelength spectrum of light and a far-infrared wavelength spectrum of light. For example, the near-infrared light-absorbing film 10 may have an average light transmittance of greater than or equal to about 90% in a wavelength spectrum of light of greater than or equal to about 950 nm, for example greater than or equal to about 850 nm.

The near-infrared light-absorbing film 10 may have, for example a thickness of about 25 μm to about 110 μm. Within the thickness range, a thin optical filter may be realized. For example, the thin optical filter may include the near-infrared light-absorbing film 10.

In this way, the near-infrared light-absorbing film 10 selectively absorbs light in a near infrared wavelength spectrum of light between a visible region and an infrared region of light in all wavelength spectrum of lights and blocks it, and thereby a cross or mixing of a signal by light in a visible region and a signal by light in a non-visible region may be prevented to decrease or prevent optical distortion such as a crosstalk.

In addition, the near-infrared light-absorbing film 10 effectively absorbs light in a near infrared region regardless of an incidence direction, and thus effectively absorbs incident light in a near infrared region from a side direction and blocks it, and thereby a distortion of a signal by light in a visible region by incident light in a near infrared region from a side may be decreased or prevented.

In addition, the near-infrared light-absorbing film 10 may have low absorbance for light in a mid-infrared wavelength spectrum of light and far-infrared wavelength spectrum of light of greater than or equal to about 950 nm and transmit like light in a visible wavelength spectrum of light, and thus it may be applied to an electronic device including an infrared ray image sensor using light in an infrared wavelength spectrum of light.

Hereinafter, a near-infrared light-absorbing film according to some example embodiments is described.

Figure 2:
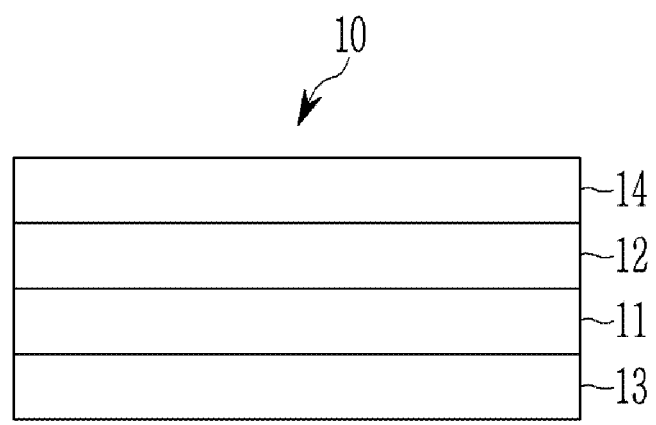
FIG. 2 is a schematic cross-sectional view showing a near-infrared light-absorbing film according to some example embodiments.

FIG. 2 is a schematic cross-sectional view showing a near-infrared light-absorbing film according to some example embodiments.

Referring to FIG. 2, a near-infrared light-absorbing film 10 according to some example embodiments includes a polymer film 11, a near-infrared light-absorbing layer 12, and other near-infrared light-absorbing layers 13 and 14. One or more layers of the other near-infrared light-absorbing layers 13 and 14 may be referred to herein as an "additional near-infrared light-absorbing layer. As shown herein, at least one additional near-infrared light-absorbing layer (13 and/or 14) may be on at least one surface of: one surface of the polymer film 11 and one surface of the near-infrared light-absorbing layer 12.

The polymer film 11 and the near-infrared light-absorbing layer 12 are the same as described above.

The other near-infrared light-absorbing layers 13 and 14 may be disposed on a lower surface of the polymer film 11 and/or on an upper/lower surface of the near-infrared light-absorbing layer 12. In the drawing, the other near-infrared light-absorbing layers 13 and 14 are illustrated but one of them may be omitted.

The other near-infrared light-absorbing layers 13 and 14 may include a copper phosphate salt. The other near-infrared light-absorbing layers near infrared wavelength spectrum of light by additionally absorbing light due to the copper phosphate salt and thereby optical distortion by light in a near infrared wavelength spectrum of light may be effectively decreased or prevented.

The copper phosphate salt may be represented by Chemical Formula 4-1 or Chemical Formula 4-2, and the structures of the copper phosphate salt are not limited thereto.

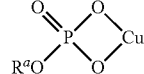

[Chemical Formula 4-1]

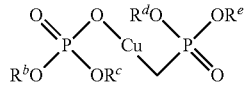

[Chemical Formula 4-2]

In Chemical Formula 4-1 and Chemical Formula 4-2, $R^a$ to $R^e$ are independently a hydrogen atom or a substituted or unsubstituted C1 to C20 alkyl group.

A near infrared reflection layer may be included on an outer surface of the near-infrared light-absorbing layers 12, 13, and 14. The near infrared reflection layer may reflect light in a near infrared wavelength spectrum of light and thereby optical distortion by light in a near infrared wavelength spectrum of light may be effectively decreased or prevented.

The near infrared reflection layer are not particularly limited as long as they reflect light in a near infrared wavelength spectrum of light, and may be for example a high refractive index reflective layer, a reflective layer including a high refractive index nanoparticle, or a multilayer including a plurality of layers having different refractive indexes, but is not limited thereto.

For example, the near infrared reflection layers may include a first layer and a second layer consisting materials having different refractive indexes, and may include a multilayer where the first layer and the second layer are alternately and repeatedly stacked.

The first layer and the second layer may be, for example a dielectric layer including an oxide layer, a nitride layer, an oxynitride layer, a sulfide layer, or a combination thereof, and for example the first layer may have a refractive index of less than about 1.7 and the second layer may have a refractive index of greater than or equal to about 1.7. Within the ranges, for example the first layer may have a refractive index of greater than or equal to about 1.1 and less than about 1.7 and the second layer may have a refractive index about 1.7 to about 2.7, or for example the first layer may have a refractive index of about 1.2 to about 1.6 and the second layer may have a refractive index of about 1.8 to about 2.5.

The first layer and the second layer may include any material having the refractive indexes within the ranges, and for example the first layer may include a silicon oxide, an aluminum oxide, or a combination thereof and the second layer may include titanium oxide, zinc oxide, indium oxide, zirconium oxide, or a combination thereof. The first layer and the second layer may be, for example a five-layered to 80-layered, for example 5-layered to 50-layered.

Thicknesses of the first layer and the second layer may be determined according to a refractive index and a reflection wavelength of each layer, for example each of the first layer may have a thickness of about 10 nm to about 700 nm and each of the second layer may have a thickness of about 30 nm to about 600 nm. Thicknesses of the first layer and the second layer may be the same or different.

The near infrared reflection layer may have, for example a thickness of about 1 μm to about 20 μm.

Other near-infrared light-absorbing layers 13 and 14 may absorb and/or reflect light in a part of the near infrared region and in a mid-infrared region and a far-infrared region, for example, in an about 700 nm to about 3 μm wavelength spectrum of light.

The near-infrared light-absorbing film 10 according to the present embodiment includes the polymer film 11 and the near-infrared light-absorbing layer 12 like the above embodiment and transmits light in a visible region effectively and blocks light in a near infrared region effectively. In addition, the near-infrared light-absorbing film 10 according to the embodiment further includes the near-infrared light-absorbing layers 13 and 14 and thus absorbs and/or reflects light in a mid-infrared region and a far-infrared region and may be effectively used as an optical filter preventing transmittance of light in all the infrared ray regions. Accordingly, the near-infrared light-absorbing film 10 may be applied to an electronic device and thus may reduce or prevent distortion of an optical signal in a visible region by light in the infrared region.

The near-infrared light-absorbing film 10 may be applied to all uses for filtering light in an infrared region, and may be, for example applied to a camera module and an electronic device including the same. The electronic device may be a digital camera, a camcorder, a monitoring camera such as CCTV, an in-car camera, a medical camera, a cell phone having a built-in or external camera, a computer having a built-in or external camera, a laptop computer having a built-in or external camera, and the like but is not limited thereto.

Figure 3:
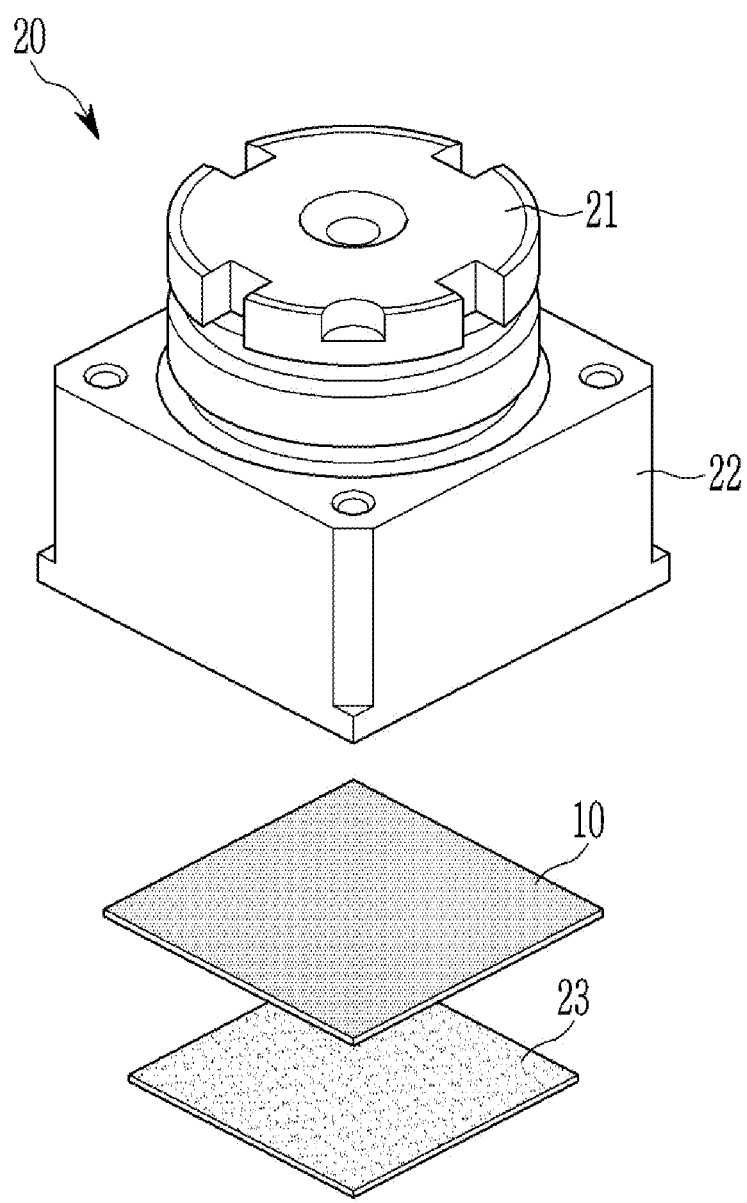
FIG. 3 is a schematic view showing a camera module according to some example embodiments.

FIG. 3 is a schematic view showing a camera module according to some example embodiments.

Referring to FIG. 3, a camera module 20 includes a lens barrel 21, a housing 22, a near-infrared light-absorbing film 10, and an image sensor 23.

The lens barrel 21 includes at least one lens imaging a subject, and the lens may be disposed along an optical axis direction. Herein, the optical axis direction may be a vertical direction of the lens barrel 21.

The lens barrel 21 is internally housed in the housing 22 and united with the housing 22. The lens barrel 21 may be moved in optical axis direction inside the housing 22 for autofocusing.

The housing 22 supports and houses the lens barrel 21 and may be open in the optical axis direction. Accordingly, incident light from one surface of the housing 22 may reach the image sensor 23 through the lens barrel 21 and the near-infrared light-absorbing film 10.

The housing 22 may be equipped with an actuator for moving the lens barrel 21 in the optical axis direction. The actuator may include a voice coil motor (VCM) including a magnet and a coil. However, various methods such as a mechanical driving system or a piezoelectric driving system using a piezoelectric device other than the actuator may be adopted.

The near-infrared light-absorbing film 10 is the same as described above.

The image sensor 23 may concentrate an image of a subject and thus store it as data, and the stored data may be displayed as an image through a display media.

The image sensor 23 may be mounted in a substrate (not shown) and electrically connected with the substrate. The substrate may be, for example, a printed circuit board (PCB) or electrically connected to a printed circuit board, and the printed circuit may be, for example, flexible printed circuit (FPCB).

The image sensor 23 concentrates light passing the lens barrel 21 and the near-infrared light-absorbing film 10 and generates a video signal and may be a complementary metal-oxide semiconductor (CMOS) image sensor and/or a charge coupled device (CCD) image sensor.

Figure 4:
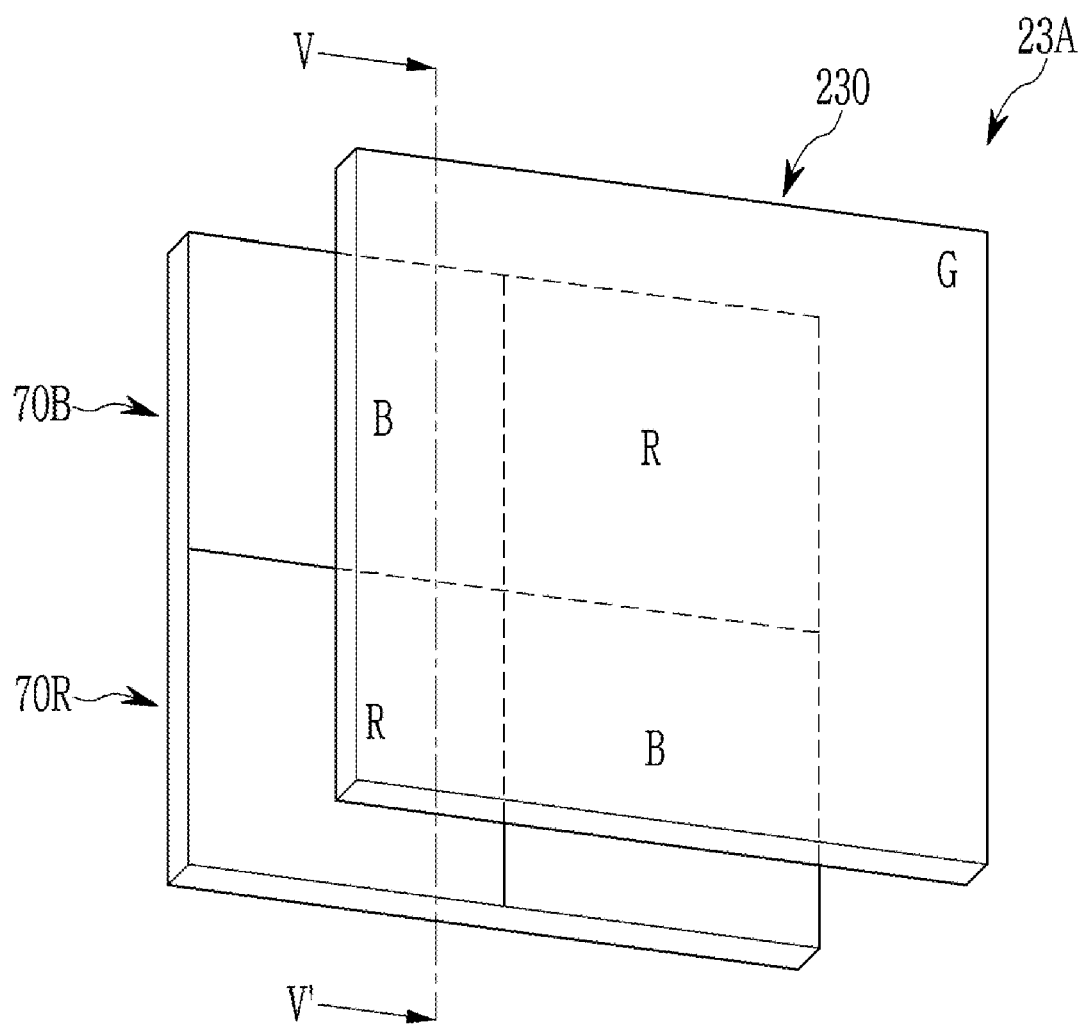
FIG. 4 is a top plan view showing an organic CMOS image sensor according to some example embodiments.
Figure 5:
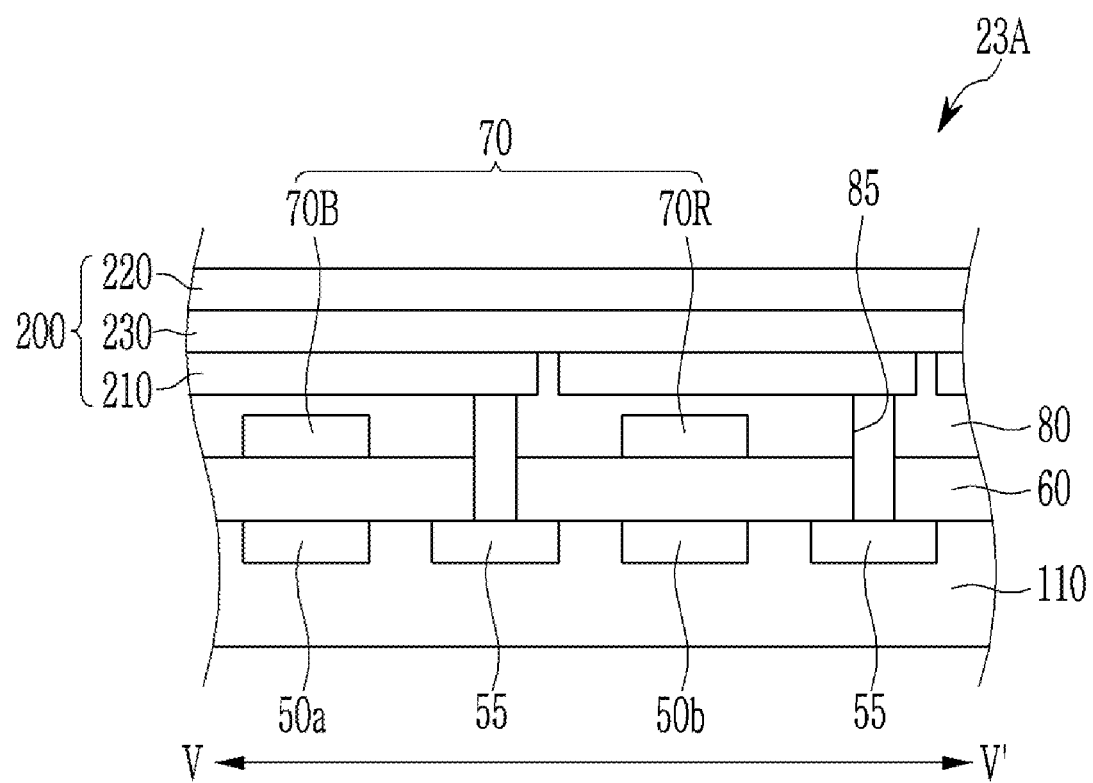
FIG. 5 is a cross-sectional view showing the organic CMOS image sensor of FIG. 4 along cross-sectional line V-V' of FIG. 4, FIGS. 6 and 7 are respectively graphs showing absorbance depending on a wavelength of the dyes used in examples and comparative examples according to some example embodiments.

FIG. 4 is a top plan view showing an organic CMOS image sensor according to some example embodiments and FIG. 5 is a cross-sectional view showing the organic CMOS image sensor of FIG. 4 along cross-sectional line V-V' of FIG. 4.

Referring to FIGS. 4 and 5, an organic CMOS image sensor 23A according to some example embodiments includes a semiconductor substrate 110 integrated with photo-sensing devices 50a and 50b, a transmission transistor (not shown), and a charge storage 55, a lower insulation layer 60, a color filter layer 70, a upper insulation layer 80, and an organic photoelectric device 200.

The semiconductor substrate 110 may be a silicon substrate, and is integrated with the photo-sensing devices 50a and 50b, the transmission transistor (not shown), and the charge storage 55. The photo-sensing devices 50a and 50b may be photodiodes.

The photo-sensing devices 50a and 50b, the transmission transistor, and/or the charge storage 55 may be integrated in each pixel, and for example as illustrated in the drawings, the photo-sensing devices 50a and 50b may be included in a blue pixel and a red pixel and the charge storage 55 may be included in a green pixel.

The photo-sensing devices 50a and 50b sense light, the information sensed by the photo-sensing devices may be transferred by the transmission transistor, the charge storage 55 is electrically connected to the organic photoelectric device 100, and the information of the charge storage 55 may be transferred by the transmission transistor.

A metal wire (not shown) and a pad (not shown) are formed on the semiconductor substrate 110. In order to decrease signal delay, the metal wire and pad may be made of a metal having low resistivity, for example, aluminum (Al), copper (Cu), silver (Ag), and alloys thereof, but is not limited thereto. However, it is not limited to the structure, and the metal wire and pad may be disposed under the photo-sensing devices 50a and 50b.

The lower insulation layer 60 is formed on the metal wire and the pad. The lower insulation layer 60 may be made of an inorganic insulating material such as a silicon oxide and/or a silicon nitride, or a low dielectric constant (low K) material such as SiC, SiCOH, SiCO, and SiOF. The lower insulation layer 60 has a trench exposing the charge storage 55. The trench may be filled with fillers.

A color filter layer 70 is formed on the lower insulation layer 60. The color filter layer 70 includes a blue filter 70a formed in the blue pixel and a red filter 70b formed in the red pixel. In the present embodiment, a green filter is not included, but a green filter may be further included.

The upper insulation layer 80 is formed on the color filter layer 70. The upper insulation layer 80 eliminates a step caused by the color filter layer 70 and smoothes the surface. The upper insulation layer 80 and lower insulation layer 60 may include a contact hole (not shown) exposing a pad, and a through-hole 85 exposing the charge storage 55 of a green pixel.

The organic photoelectric device 200 is formed on the upper insulation layer 80. The organic photoelectric device 200 includes a lower electrode 210 and an upper electrode 220 facing each other and a light-absorbing layer 230 disposed between the lower electrode 210 and the upper electrode 220.

The lower electrode 210 and the upper electrode 220 may be all light-transmitting electrodes and the light-absorbing layer 230 may selectively absorb light in a green wavelength spectrum of light and may replace a color filter of a green pixel.

As described above, the semiconductor substrate 110 and the organic photoelectric device 200 selectively absorbing light in a green wavelength spectrum of light have a stack structure and thereby the size of an image sensor may be reduced to realize a down-sized image sensor.

Focusing lens (not shown) may be further formed on the organic photoelectric device 200. The focusing lens may control a direction of incident light and gather the light in one region. The focusing lens may have a shape of, for example, a cylinder or a hemisphere, but is not limited thereto.

In FIGS. 4 and 5, a structure where the organic photoelectric device selectively absorbing light in a green wavelength spectrum of light is stacked on the semiconductor substrate 110 is illustrated, but the present disclosure is not limited thereto. An organic photoelectric device selectively absorbing light in a blue wavelength spectrum of light may be stacked on the semiconductor substrate 110 and a green photo-sensing device and a red photo-sensing device may be integrated in the semiconductor substrate 110 or an organic photoelectric device selectively absorbing light in a red wavelength spectrum of light may be stacked on the semiconductor substrate 110 and a green photo-sensing device and a blue photo-sensing device may be integrated in the semiconductor substrate 110.

Among the light in a visible region passing the lens barrel 21 and the near-infrared light-absorbing film 10, light in a green wavelength spectrum of light may be mainly absorbed in the light-absorbing layer 30 and photoelectrically converted, and light in a blue wavelength spectrum of light and a red wavelength spectrum of light may pass the lower electrode 210 and be sensed by the photo-sensing devices 50a and 50b.

As described above, the near-infrared light-absorbing film 10 may effectively transmit light in a visible region but absorb and block light in a near infrared region and thus transfer pure light in a visible region to an image sensor and resultantly, reduce or prevent a crosstalk generated when a signal by light in a visible region and a signal by light in a non-visible region are crossed and mixed in.

Hereinafter, the embodiments are illustrated in more detail with reference to examples. However, these examples are exemplary, and the present scope is not limited thereto.

Synthesis of Dye

[Dye 1-1]

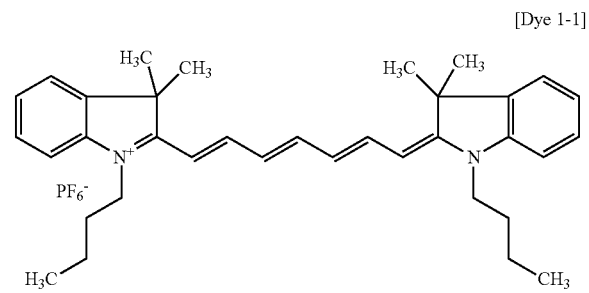

(Absorbance at a maximum absorption wavelength ($\lambda_{max}$)/Absorbance at a wavelength of 550 nm=81.5)

1,1'-Dibutyl-3,3,3',3'-tetramethylindotricarbocyanine Hexafluoro-phosphate (manufactured by TCI Inc.)

[Dye 1-2]

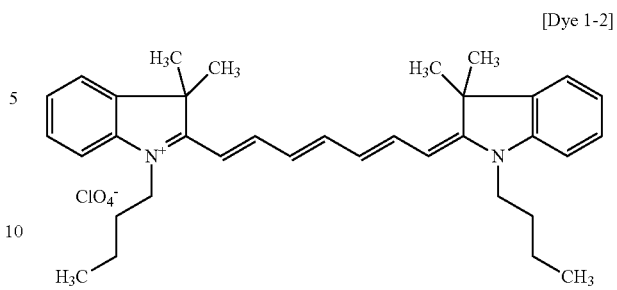

(Absorbance at a maximum absorption wavelength ($\lambda_{max}$)/Absorbance at a wavelength of 550 nm=47.2)

1.0 g (1.61 mmol) of 1,1'-dibutyl-3,3,3',3'-tetramethylindotricarbocyanine Iodide is stirred with 30 mL of DMF under a nitrogen atmosphere. 2.05 g (8.05 mmol) of iron (II) perchlorate hydrate [Fe(ClO$_4$)$_2$xH$_2$O] is added thereto and reacted therewith at room temperature for 20 hours. When the reaction is complete, the resultant is crystallized with an excessive amount of water to obtain 0.8 g of a light purple solid. (A yield: 82%, MALDI-TOF m/z=493.5, 99.5)

[Dye 1-3]

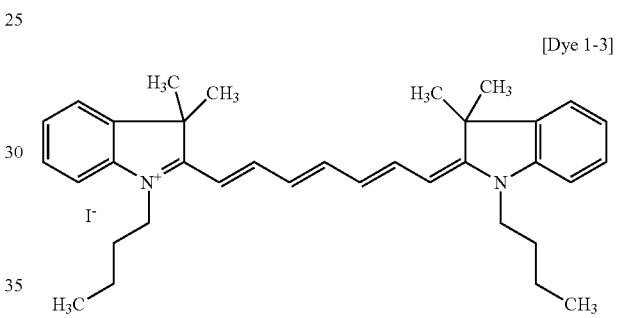

(Absorbance at a maximum absorption wavelength ($\lambda_{max}$)/Absorbance at a wavelength of 550 nm=37.1)

A conventional method [Journal of Fluorine Chemistry, 174, 132-136 2015] is used to manufacture Dye 1-3 (MALDI-TOF m/z=493.5, 127.4)

[Dye 1-4]

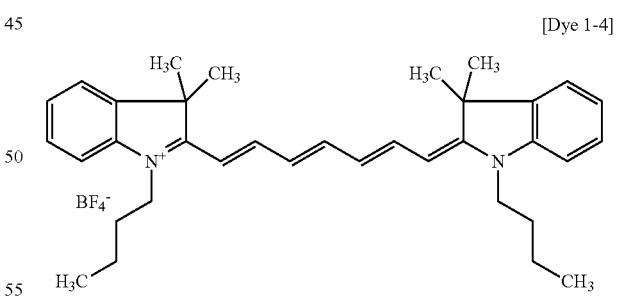

(Absorbance at a maximum absorption wavelength ($\lambda_{max}$)/Absorbance at a wavelength of 550 nm=52.4)

1.0 g (1.61 mmol) of 1,1'-dibutyl-3,3,3',3'-tetramethylindotricarbocyanine Iodide is stirred with 25 mL of DMF under a nitrogen atmosphere. 2.71 g (8.05 mmol) of iron (II) tetrafluoroborate hexahydrate [Fe(BF$_4$)$_2$ 6H$_2$O] is added thereto, and the obtained mixture is reacted at room temperature for 20 hours. When the reaction is complete, the resultant is crystallized with an excessive amount to obtain 0.8 g of a reddish brown solid. (A yield: 86%, MALDI-TOF m/z=493.4, 86.4)

[Dye 2-1]

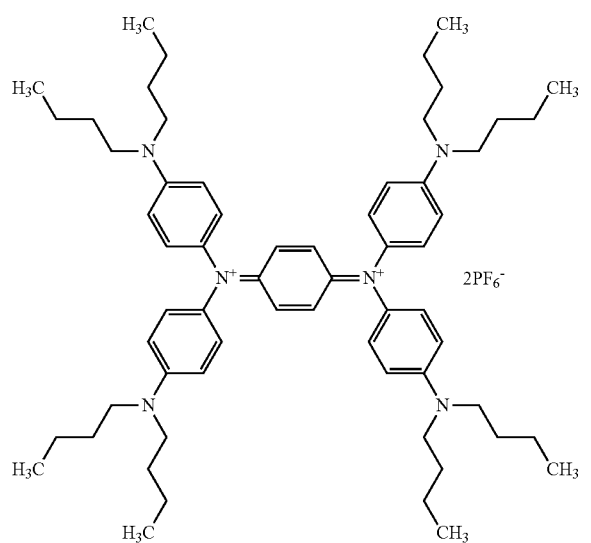

(Absorbance at a maximum absorption wavelength ($\lambda_{max}$)/Absorbance at a wavelength of 550 nm=28.8)

3.68 g (0.004 mol) of N,N,N',N'-tetrakis[p-di(butyl)aminophenyl]-p-phenylene (Kyung-ln Synthetic Corp.) is stirred with 25 mL of DMF under a nitrogen atmosphere. 1.44 g (0.0084 mol) of AgNO$_3$ is added thereto, and the obtained mixture is reacted at 70° C. for 5 hours. When the reaction is complete, the resultant is filtered without separate purification, 5.6 g (0.02 mol) of cesium hexafluorophosphate (CsPF$_6$) is added thereto, the obtained mixture at room temperature for greater than or equal to 20 hours. When the reaction is complete, the obtained resultant is crystallized with an excessive amount of water to obtain 4.1 g of a blackish brown solid. (A yield: 96%, MALDI-TOF m/z=920.9, 145.5)

[Dye 2-2]

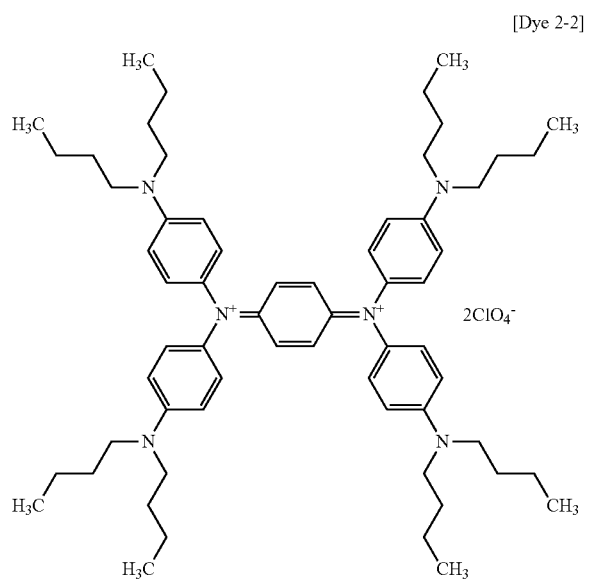 [SMILES: CCCCN(CCCC)c1ccc([N+](=C2C=CC(=[N+](c3ccc(N(CCCC)CCCC)cc3)c3ccc(N(CCCC)CCCC)cc3)C=C2)c2ccc(N(CCCC)CCCC)cc2)cc1 ; "2ClO4-"]

(Absorbance at a maximum absorption wavelength ($\lambda_{max}$)/Absorbance at a wavelength of 550 nm=27.3)

4.0 g of a blackish brown solid is obtained according to the same method as that of manufacturing Dye 2-1 except for using 5.10 g of Iron(II) perchlorate hydrate [Fe(ClO$_4$)$_2$ xH$_2$O] instead of the cesium hexafluorophosphate (CsPF$_6$). (A yield: 98%, MALDI-TOF m/z=920.9, 99.5)

[Dye 2-3]

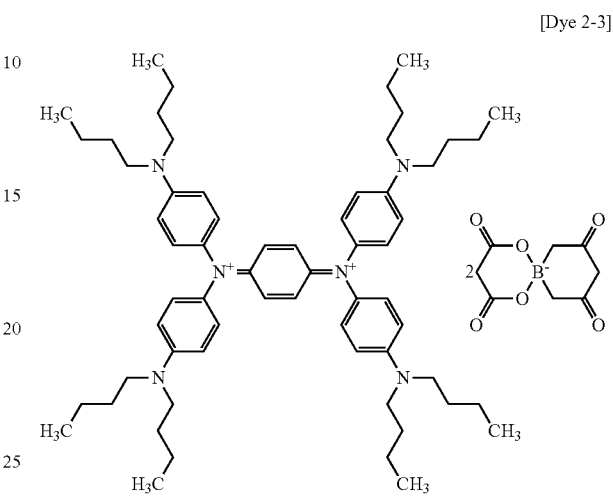

(Absorbance at a maximum absorption wavelength ($\lambda_{max}$)/Absorbance at a wavelength of 550 nm=24.3)

4.0 g of a blackish brown solid is manufactured according to the same method as that of manufacturing Dye 2-1 except for using 1.4 g of lithium bis(oxalate)borate (LiBOB) instead of the cesium hexafluorophosphate (CsPF$_6$). (A yield: 90%, MALDI-TOF m/z=920.7, 186.5)

Evaluation of Absorbance

Absorbance is evaluated by using a UV-Vis spectrophotometer (Agilent 8453, Agilnet Technologies). The results are shown in Tables 1 and 2 and FIGS. 6 to 11.

(Single Dye Evaluation)

A dye evaluation solution having a composition shown in Table 1 is prepared by dissolving 0.50 g of a single dye in 50 ml of chloroform. (unit: g/mL)

TABLE 1

| Dye | Series | Anion | Maximum absorption wavelength | Absorbance A (UVmax) | Absorbance B at 550 nm | Contrast Ratio (A/B) |
|---|---|---|---|---|---|---|
| 1-1 | Cyanine | PF$_6$ | 755 nm | 0.9555 | 0.01172[*1] | 81.5 |
| 1-2 | | ClO$_4$ | 760 nm | 0.5531 | 0.01172[*1] | 47.2 |
| 1-3 | | I | 760 nm | 0.4347 | 0.01172[*1] | 37.1 |
| 1-4 | | BF$_4$ | 754 nm | 0.6138 | 0.01172[*1] | 52.4 |
| 2-1 | Diimmonium | PF$_6$ | 991 nm | 1.4166 | 0.03994[*2] | 35.5 |
| 2-2 | | ClO$_4$ | 967 nm | 1.0440 | 0.03994[*2] | 26.1 |
| 2-3 | | BOB[*3] | 967 nm | 0.9694 | 0.03994[*2] | 24.3 |

[*1] UV absorption baseline calibration of a dye at 550 nm
[*2] UV absorption average value of a dye at 550 nm
[*3] Bis(oxalate)borate (Mixed Dye Evaluation)

A dye evaluation solution having a composition shown in Table 2 is prepared by mixing each single dye evaluation solution in a ratio of 1/1 (v/v) for 2 hours.

TABLE 2

| | (unit: mL) | | | | | | |
|---|---|---|---|---|---|---|---|
| | Cyanine dye | | | | Diimmonium dye | | |
| | 1-1 | 1-2 | 1-3 | 1-4 | 2-1 | 2-2 | 2-3 |
| Example 1 | 5 | — | — | — | 5 | — | — |
| Example 2 | — | — | — | 5 | 5 | — | — |
| Comparative Example 1 | 5 | — | — | — | — | 5 | — |
| Comparative Example 2 | 5 | — | — | — | — | — | 5 |
| Comparative Example 3 | — | 5 | — | — | 5 | — | — |
| Comparative Example 4 | — | 5 | — | — | — | — | 5 |
| Comparative Example 5 | — | — | 5 | — | — | 5 | — |
| Comparative Example 6 | — | — | 5 | — | — | — | 5 |
| Comparative Example 7 | | | | 5 | 5 | | |
| Comparative Example 8 | | | | 5 | | | 5 |

Referring to Tables 1 and 2 and FIGS. 6 to 11, the compositions according to Examples 1 and 2 transmitted light in a visible region but vastly blocked light in a near infrared region and thus may be usefully used as a composition for a near-infrared light-absorbing film compared with the compositions according to Comparative Examples 1 to 8.

(Optical Film Manufacture and Evaluation Using Dye 1-1 and Dye 2-1)

A near infrared ray filter film is formed by mixing Dye 1-1 and Dye 2-1 with an acryl binder (HT1335, Samwha Paints Industrial Co., Ltd.) and a solvent (methyl ethyl ketone) to prepare a composition and coating the composition on a TAC film (80 μm) with a wire bar (#No. 9). The results are shown in Table 3 and FIG. 12.

TABLE 3

| | Dye 1-1 | Dye 2-1 | Binder | 430 nm-565 nm (%) | 700 nm-740 nm (%) | 1000 nm-1200 nm (%) |
|---|---|---|---|---|---|---|
| Example 3 | 0.20 | 0.30 | 100 | 82.6 | 4.3 | 33.0 |
| Example 4 | 0.18 | 0.30 | 100 | 82.8 | 5.5 | 33.0 |
| Example 5 | 0.15 | 0.35 | 100 | 82.7 | 9.1 | 31.2 |

Figure 12:
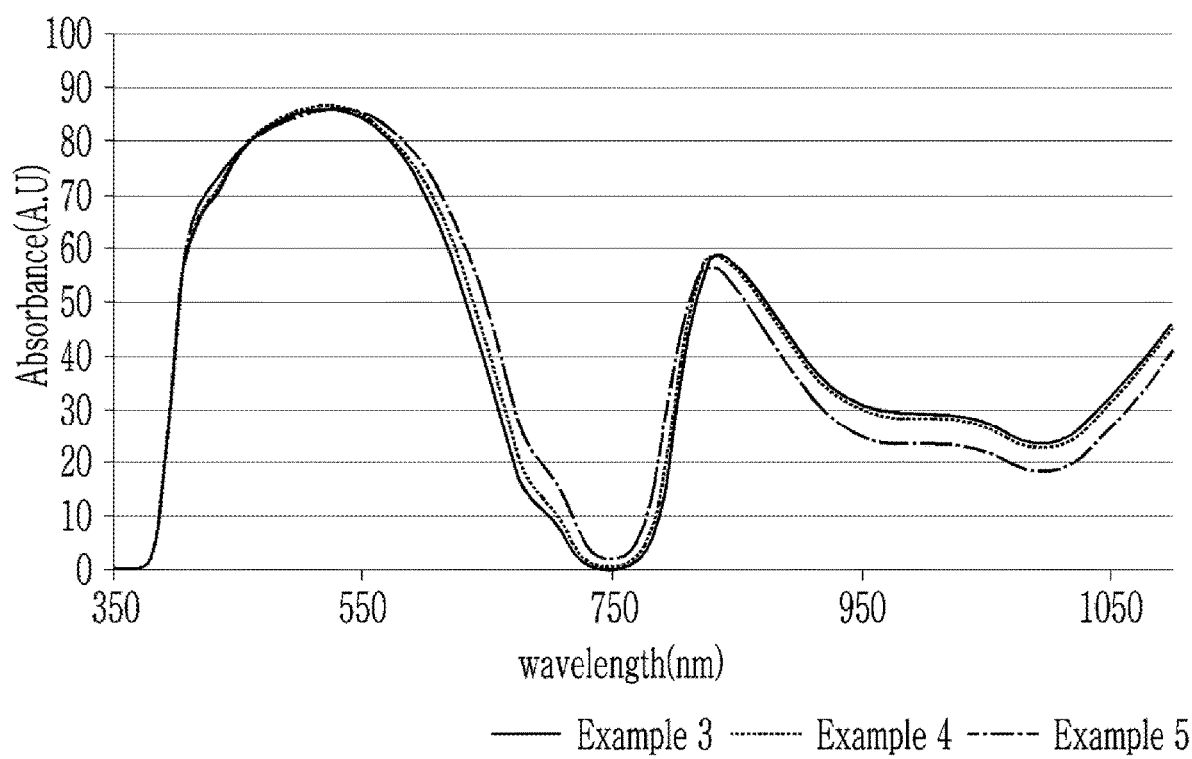
FIG. 12 is a graph showing absorbance depending on a wavelength of the film according to examples according to some example embodiments.

Referring to Table 3 and FIG. 12, the compositions according to Examples 3 to 5 show high light transmittance of greater than or equal to 82% in a visible region (430 nm to 565 nm) but low light transmittance of less than or equal to 10% in a wavelength spectrum of light of 700 nm to 740 nm and simultaneously light transmittance of less than or equal to 35% in a visible wavelength spectrum of light of 1000 nm to 1200 nm and thus transmitted light in a visible region but vastly blocked light in a near infrared region and accordingly, may be usefully used as a composition for a near-infrared light-absorbing film.

While this disclosure has been described in connection with what is presently considered to be practical example embodiments, it is to be understood that the inventive concepts are not limited to the disclosed embodiments, but, on the contrary, is intended to cover various modifications and equivalent arrangements included within the spirit and scope of the appended claims.

DESCRIPTION OF SYMBOLS

10: near-infrared light-absorbing film
11: polymer film
12: near-infrared light-absorbing layer
13, 14: other near-infrared light-absorbing layers
20: camera module
21: lens barrel
22: housing
23: image sensor
23A: organic CMOS image sensor
50a, 50b: photo-sensing device
70: color filter layer
60, 80: insulation layer
200: organic photoelectric device
210: lower electrode
220: upper electrode
230: light-absorbing layer

What is claimed is:

1. A composition, comprising:
a binder, a compound represented by Chemical Formula 1, and a compound represented by Chemical Formula 2:

[Chemical Formula 1]

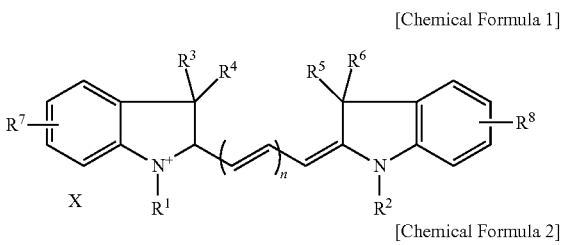

[Chemical Formula 2]

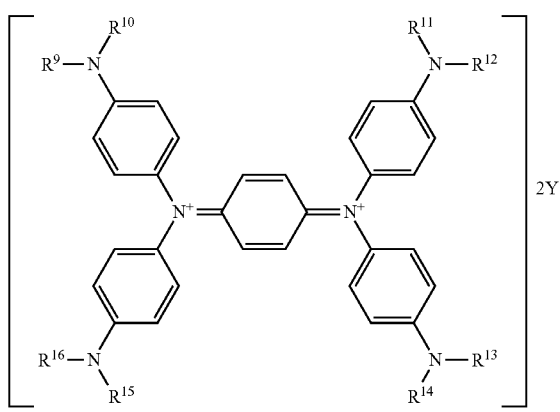

wherein, in Chemical Formula 1 and Chemical Formula 2,
$R^1$ to $R^8$ are independently a hydrogen atom or a substituted or unsubstituted C1 to C8 alkyl group,
$R^9$ to $R^{16}$ are independently a hydrogen atom, a substituted or unsubstituted C1 to C8 alkyl group, or a substituted or unsubstituted C6 to C20 aryl group,
X is $PF_6^-$ or $BF_4^-$,
Y is $PF_6^-$, and
n is an integer ranging from 1 to 10,
wherein the compound represented by Chemical Formula 1 and the compound represented by Chemical Formula 2 are included in the composition in weight ratio of about 1:1 to about 1:3.

2. The composition of claim 1, wherein
the compound represented by Chemical Formula 1 has a maximum absorption wavelength ($\lambda_{max}$) within a wavelength spectrum of about 700 nm to about 800 nm, and
the compound represented by Chemical Formula 2 has a maximum absorption wavelength ($\lambda_{max}$) within a wavelength spectrum of about 800 nm to about 1200 nm.

3. The composition of claim 1, wherein
the composition includes a first amount of the compound represented by Chemical Formula 1 and a second amount of the compound represented by Chemical Formula 2, and
a total amount of the first amount and the second amount is an amount of about 0.2 parts by weight to about 5.0 parts by weight relative to 100 parts by weight of the binder.

4. The composition of claim 1, further comprising:
a squarylium-based compound represented by Chemical Formula 3:

[Chemical Formula 3]

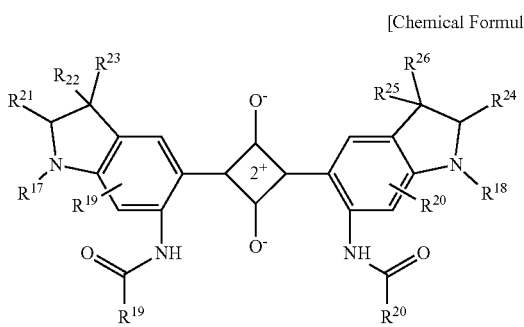

wherein, in Chemical Formula 3,
$R^{17}$ to $R^{26}$ are independently a hydrogen atom, a substituted or unsubstituted C1 to C20 alkyl group, or a substituted or unsubstituted C6 to C20 aryl group.

5. The composition of claim 1, wherein
the compound represented by Chemical Formula 1 has an absorbance at a maximum absorption wavelength ($\lambda_{max}$) that is at least about 30 times as great as an absorbance of the compound represented by Chemical Formula 1 at a wavelength of about 550 nm, and
the compound represented by Chemical Formula 2 has an absorbance at a maximum absorption wavelength ($\lambda_{max}$) that is at least about 20 times as great as an absorbance of the compound represented by Chemical Formula 2 at a wavelength of about 550 nm.

6. The composition of claim 1, wherein the composition has an average light transmittance of less than or equal to about 10% in a wavelength spectrum of light of about 700 nm to about 740 nm.

7. The composition of claim 1, wherein the composition has an average light transmittance of greater than or equal to about 82% in a wavelength spectrum of light of about 430 nm to about 565 nm.

8. The composition of claim 1, wherein the binder includes an acrylic binder, an epoxy binder, or a combination thereof.

9. A film comprising a layer including a cured product of the composition of claim 1.

10. The film of claim 9, which further includes a polymer film on one surface of the layer.

11. The film of claim 10, wherein the polymer film includes polyethylene terephthalate, polyethylene naphthalate, triacetyl cellulose, polycarbonate, a cycloolefin polymer, poly(meth)acrylate, polyimide, or a combination thereof.

12. The film of claim 10, wherein the polymer film is configured to selectively absorb light in a wavelength spectrum of light that is at least a portion of an ultraviolet (UV) wavelength spectrum of light.

13. The film of claim 10, wherein the layer is configured to absorb near-infrared light, and the film further comprises:
an additional near-infrared light-absorbing layer on at least one surface of
one surface of the polymer film, and
another one surface of the layer.

14. The film of claim 13, wherein the additional near-infrared light-absorbing layer includes a copper phosphate salt.

15. The film of claim 9, which has a thickness of about 25 μm to about 110 μm.

16. A camera device comprising the film of claim 9.

17. The camera device of claim 16, further comprising:
a lens, and
an image sensor.

18. An electronic device comprising the camera device of claim 16.

* * * * *